US007252277B2

(12) United States Patent
Sweere et al.

(10) Patent No.: US 7,252,277 B2
(45) Date of Patent: Aug. 7, 2007

(54) SUPPORT ARM

(75) Inventors: Harry C. Sweere, Minneapolis, MN (US); Thiem Wong, Brooklyn Park, MN (US); Khalid Al-Zebdeh, Apple Valley, MN (US); Mustafa A. Ergun, Shoreview, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 10/759,840

(22) Filed: Jan. 17, 2004

(65) Prior Publication Data

US 2004/0245419 A1    Dec. 9, 2004

Related U.S. Application Data

(60) Provisional application No. 60/492,015, filed on Aug. 1, 2003, provisional application No. 60/471,869, filed on May 20, 2003, provisional application No. 60/441,143, filed on Jan. 17, 2003.

(51) Int. Cl.
*A47G 29/00* (2006.01)

(52) U.S. Cl. .................. 248/371; 248/284.1; 248/917; 248/923; 361/681

(58) Field of Classification Search ............. 248/284.1, 248/281.11, 286.1, 280.11, 372.1, 162.1, 248/404, 405, 406.2, 371, 917–924; 361/681
See application file for complete search history.

(56) References Cited

U.S. PATENT DOCUMENTS

| 2,010,214 | A | 8/1935 | Braun |
| 2,168,209 | A | 8/1939 | Haupt |
| 2,178,122 | A | 10/1939 | Ostler et al. |
| 2,471,998 | A | 5/1949 | Berggren |
| 2,480,865 | A | 9/1949 | Lofstrand |
| 2,506,228 | A | 5/1950 | Lofstrand, Sr. |
| 2,535,305 | A * | 12/1950 | Loepsinger ................. 248/571 |
| 2,657,925 | A | 11/1953 | Crow |
| 2,924,411 | A | 2/1960 | Rouverol |
| 3,269,035 | A | 8/1966 | Bong |
| 3,543,282 | A | 11/1970 | Sautereau |
| 3,575,368 | A | 4/1971 | Thomas et al. |
| 3,675,597 | A | 7/1972 | Oddsen et al. |
| 3,767,181 | A | 10/1973 | Van der Burgt et al. |
| 3,890,907 | A | 6/1975 | Peterson |

(Continued)

FOREIGN PATENT DOCUMENTS

DE        1091279        10/1960

(Continued)

*Primary Examiner*—Amy J. Sterling
(74) *Attorney, Agent, or Firm*—Fredrikson & Byron, PA

(57) ABSTRACT

An apparatus for supporting a load is disclosed. A support arm in accordance with an exemplary embodiment of present invention comprises a first strut, a second strut, a proximal link, and a distal link. A proximal portion of the first strut is pivotally coupled to the proximal link at a first proximal joint. Additionally, a proximal portion of the second strut is pivotally coupled to the proximal link at a second proximal joint. A distal end of the second strut is pivotally coupled to the distal link at a second distal joint. A distal end of the first strut is pivotally coupled to the distal link at a first distal joint. The support arm also includes a cam mechanism comprising a cam and a cam follower.

25 Claims, 17 Drawing Sheets

U.S. PATENT DOCUMENTS

| | | |
|---|---|---|
| RE28,767 E | 4/1976 | Kuhlmann et al. |
| 4,215,776 A | 8/1980 | Esler |
| 4,351,245 A | 9/1982 | Laporte |
| 4,357,249 A | 11/1982 | Mellor |
| 4,387,468 A | 6/1983 | Fenne et al. |
| 4,387,876 A | 6/1983 | Nathan |
| 4,389,228 A | 6/1983 | Leunig |
| 4,427,243 A | 1/1984 | Miller |
| 4,494,720 A | 1/1985 | Gregory et al. |
| 4,605,189 A | 8/1986 | Bruneau |
| 4,685,648 A | 8/1987 | Dobner et al. |
| 4,691,886 A | 9/1987 | Wendling et al. |
| 4,697,977 A | 10/1987 | Loomer et al. |
| 4,706,920 A | 11/1987 | Ojima et al. |
| 4,751,884 A | 6/1988 | Ball |
| 4,760,622 A | 8/1988 | Rohrman |
| 4,768,762 A | 9/1988 | Lund |
| 4,836,478 A | 6/1989 | Sweere |
| 4,856,740 A | 8/1989 | MacLeod et al. |
| 4,914,780 A | 4/1990 | Rogers et al. |
| 4,920,381 A | 4/1990 | Mahoney |
| 4,953,256 A | 9/1990 | Salmela et al. |
| 4,953,748 A | 9/1990 | Wheelock |
| 4,964,152 A | 10/1990 | Kaul et al. |
| 4,964,221 A | 10/1990 | Breyer et al. |
| 4,979,773 A * | 12/1990 | Eubank ............... 296/65.05 |
| 5,026,117 A * | 6/1991 | Faiks et al. ............ 297/300.5 |
| 5,076,533 A * | 12/1991 | Schubert ................. 248/585 |
| 5,101,735 A | 4/1992 | Williams |
| 5,125,631 A * | 6/1992 | Brodersen et al. .......... 267/131 |
| 5,143,333 A | 9/1992 | Warden |
| 5,160,104 A | 11/1992 | Sher |
| 5,246,191 A | 9/1993 | Moss |
| 5,292,097 A * | 3/1994 | Russell ................ 248/281.11 |
| 5,305,996 A | 4/1994 | Taniwa et al. |
| 5,311,827 A | 5/1994 | Greene |
| 5,400,721 A | 3/1995 | Greene |
| 5,487,525 A | 1/1996 | Drabczyk et al. |
| 5,520,361 A | 5/1996 | Lee |
| 5,589,849 A | 12/1996 | Ditzik |
| 5,626,323 A | 5/1997 | Lechman et al. |
| 5,668,570 A | 9/1997 | Ditzik |
| 5,718,406 A | 2/1998 | Long |
| 5,722,513 A | 3/1998 | Rowan et al. |
| 5,738,316 A | 4/1998 | Sweere et al. |
| 5,743,503 A | 4/1998 | Voeller et al. |
| 5,836,562 A | 11/1998 | Danzyger et al. |
| 5,842,672 A | 12/1998 | Sweere et al. |
| 5,860,370 A | 1/1999 | Poniecki |
| 5,876,008 A | 3/1999 | Sweere et al. |
| 5,881,984 A | 3/1999 | Lin |
| 5,902,201 A | 5/1999 | Vermeer et al. |
| 5,918,841 A | 7/1999 | Sweere et al. |
| 5,924,665 A | 7/1999 | Sweere et al. |
| 5,947,429 A | 9/1999 | Sweere et al. |
| 5,967,479 A | 10/1999 | Sweere et al. |
| 5,992,809 A | 11/1999 | Sweere et al. |
| 6,012,693 A | 1/2000 | Voeller et al. |
| 6,019,332 A | 2/2000 | Sweere et al. |
| 6,026,755 A | 2/2000 | Long |
| 6,038,986 A * | 3/2000 | Ransil et al. ................ 108/145 |
| 6,064,373 A | 5/2000 | Ditzik |
| 6,189,849 B1 | 2/2001 | Sweere et al. |
| 6,227,518 B1 | 5/2001 | Sun |
| 6,326,955 B1 | 12/2001 | Ditzik |
| 6,378,829 B1 | 4/2002 | Strater et al. |
| 6,434,851 B1 | 8/2002 | Nishina |
| 6,523,796 B2 * | 2/2003 | Abramowsky et al. .. 248/284.1 |
| 6,890,027 B2 * | 5/2005 | Marie et al. ............. 297/216.1 |
| 2002/0088910 A1 | 7/2002 | Sweere et al. |
| 2002/0100851 A1 | 8/2002 | Abramowsky |
| 2004/0035243 A1 | 2/2004 | Duval |
| 2004/0099779 A1* | 5/2004 | Mileos et al. .......... 248/281.11 |

FOREIGN PATENT DOCUMENTS

| | | |
|---|---|---|
| DE | 1171222 | 5/1964 |
| DE | 1611809 A1 | 1/1971 |
| DE | 3406669 A1 | 8/1985 |
| DE | 3610612 A1 | 11/1987 |
| DE | 19635236 C1 | 3/1998 |
| DE | 299 08 098 U1 | 9/1999 |
| EP | 0 183 938 A1 | 6/1986 |
| EP | 1 052 472 A2 | 11/2000 |
| FR | 831 809 | 9/1938 |
| FR | 2 037 056 | 12/1970 |
| GB | 785363 | 10/1957 |
| GB | 2154442 A | 9/1985 |
| GB | 2346071 A | 8/2000 |

* cited by examiner

SUPPORT ARM

RELATED APPLICATIONS

The present Application claims the benefit of U.S. Provisional Patent Application Ser. No. 60/441,143, filed Jan. 17, 2003.

The present Application claims the benefit of U.S. Provisional Patent Application Ser. No. 60/471,869, filed May 20, 2003.

The present Application claims the benefit of a U.S. Provisional Patent Application No. 60/492,015 filed on Aug. 1, 2003.

The present Application is related to U.S. patent application Ser. No. 10/644,437 filed on Aug. 20, 2003.

The entire disclosure of the above-mentioned patent applications is hereby incorporated by reference herein.

FIELD OF THE INVENTION

The present invention relates generally to an apparatus for supporting a load. More particularly, the present invention relates to an apparatus that is positionable, so that the location of a supported load can be changed from time to time. In some, but not necessarily all, cases the apparatus provides a substantially constant supporting force.

BACKGROUND OF THE INVENTION

There are many applications in which lifts, arms, counterbalances, and force and torque providing mechanisms may be useful. Mechanisms such as these can be used to raise and lower a variety of items including, but not limited to, the examples listed below:
- video monitors of all sizes
- furniture work surfaces
- production assembly tools
- work load transfer equipment
- kitchen cabinets
- vertically oriented exercise equipment
- robot control devices
- windows These mechanisms can also be used to provide forces and torques in other orientations (e.g., horizontal or radial). Examples of such applications include, but are not limited to:
- continuous constant force feeding systems for machine tools
- horizontally oriented exercise equipment
- drawer closing applications
- door closing application One application for such a mechanism is the support of a display monitor for a personal computer. Personal computers and/or display monitors are often placed directly on a desk or on a computer case. However, to increase desk space, or to respond to the ergonomic needs of different operators, computer monitors are sometimes mounted on elevating structures. Alternatively, monitors are mounted to a surface such as a wall, instead of placing the monitor on a desk or a cart.

However, personal computers and/or display monitors are often used by multiple operators at different times during a day. In some settings, one computer and/or monitor may be used by multiple people of different sizes and having different preferences in a single day. Given the differences in people's size and differences in their preferences, a monitor or display adjusted at one setting for one individual is highly likely to be inappropriate for another individual. For instance, a child would have different physical space needs than an adult using the same computer and monitor.

In addition, operators are using computers for longer periods of time which increases the importance of comfort to the operator. An operator may choose to use the monitor as left by the previous user despite the discomfort, annoyance and inconvenience experienced by a user who uses settings optimized for another individual, which may even result in injury after prolonged use.

Moreover, as monitors grow in size and weight, ease of adjustability is an important consideration. For monitors requiring frequent adjustment, adjustability for monitors has been provided using an arm coupled with gas springs, where the arm is hingedly coupled with the desk or a vertical surface. However, the gas springs are costly and wear out over time. In addition, the gas springs require a significant amount of space, for instance arm length, which can be at a premium in certain applications, such as in hospitals.

Thus, there is a need for a support are that is less costly to manufacture and maintain, has increased reliability, allows easy adjustability, is scalable to many different sized loads, is adaptable to provide a long range of travel, and is adaptable to provide constant support force as the load is being positioned.

SUMMARY OF THE INVENTION

The present invention relates generally to an apparatus for supporting a load. A support arm in accordance with an exemplary embodiment of present invention comprises a first strut, a second strut, a proximal link, and a distal link. A proximal portion of the first strut is pivotally coupled to the proximal link at a first proximal joint. Additionally, a proximal portion of second strut is pivotally coupled to the proximal link at a second proximal joint. A distal end of the second strut is pivotally coupled to the distal link at a second distal joint. A distal end of the first strut is pivotally coupled to the distal link at a first distal joint.

The support arm also includes a cam mechanism comprising a cam and a cam follower. In some useful embodiments of the current invention, the cam mechanism converts the force of a spring (e.g., a compression, extension, torsional and/or leaf spring) to a sinusoidal moment load of the rotating arm. In some embodiments, the cam mechanism may comprise an energy source for urging the cam follower against a cam surface of the cam. When this is the case, the support arm may also include an adjustment mechanism for varying the output of the energy source.

In some embodiments, a spring is provided for urging the cam follower against the cam surface of the cam. When this is the case, an adjustment mechanism for varying the preload of the spring may also be provided. In one exemplary embodiment, the adjustment mechanism comprises a spring plate coupled to the spring and a screw that is capable of adjusting the position of the spring plate. Other ways of adjusting the energy output of the spring may be possible without deviating from the spirit and scope of the present invention. The present invention describes an apparatus to provide these capabilities at a much lower cost compared to traditional arms based on gas spring technology.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
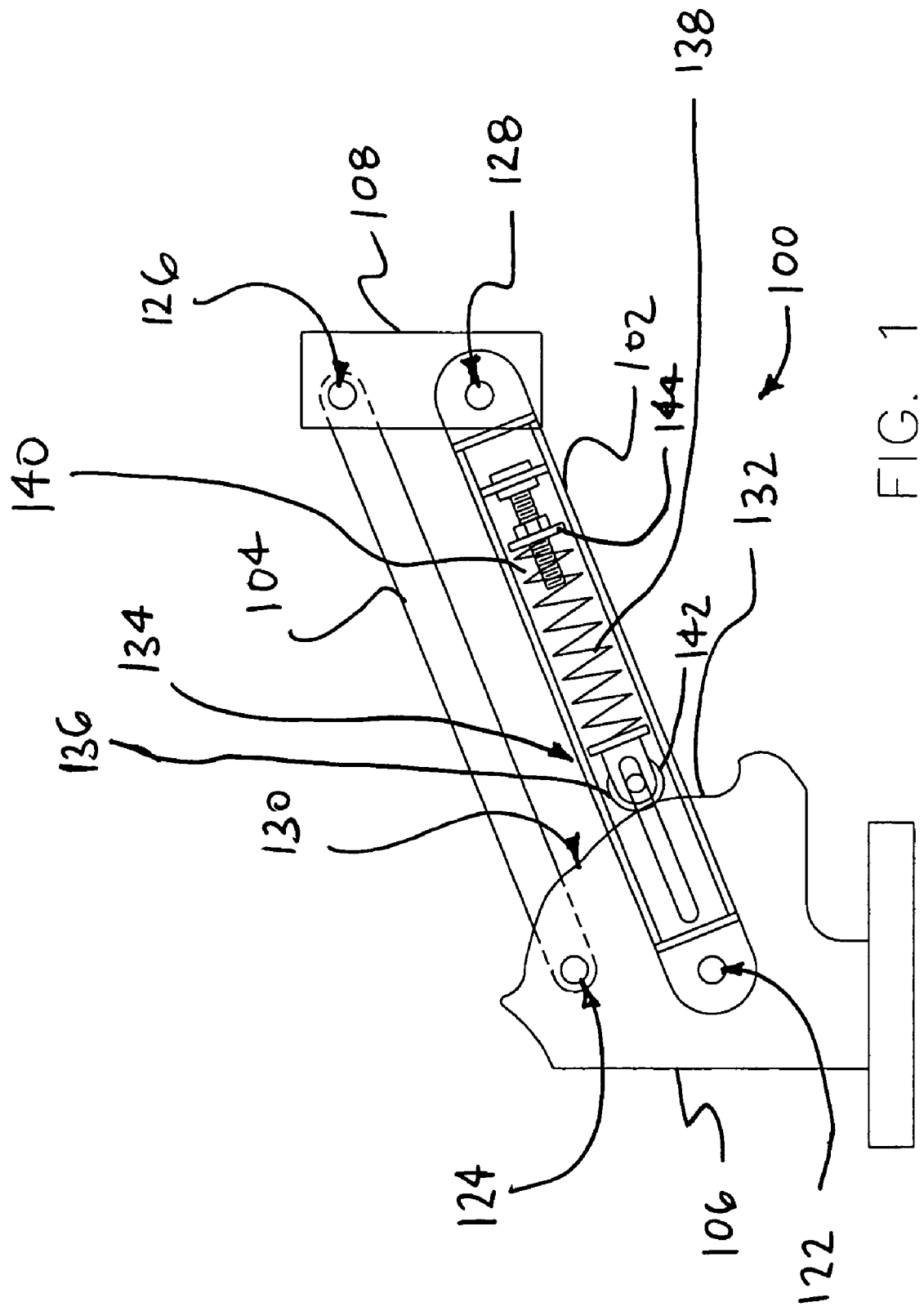
FIG. 1 is a diagrammatic representation of a support arm in accordance with an exemplary embodiment of the present invention.

FIG. 1 is a diagrammatic representation of a support arm 100 in accordance with an exemplary embodiment of the present invention. Support arm 100 includes a first strut 102, a second strut 104, a proximal link 106, and a distal link 108. In the embodiment of FIG. 1, a proximal portion of the first strut 102 is pivotally coupled to proximal link 106 at a first proximal joint 122. Additionally, a proximal portion of second strut 104 is pivotally coupled to proximal link 106 at a second proximal joint 124. A distal end of second strut 104 is pivotally coupled to distal link 108 at a second distal joint 126. A distal end of first strut 102 is pivotally coupled to distal link 108 at a first distal joint 128.

In the embodiment of FIG. 1, proximal link 106 comprises a cam 130 having a first cam surface 132. Support arm 100 of FIG. 1 includes a cam following assembly 134 comprising a cam follower 136 and a spring 138 that is capable of urging cam follower 136 against first cam surface 132 of cam 130. In the embodiment of FIG. 1, cam follower 136 and spring 138 are disposed within a lumen 140 defined by first strut 102. Also in the embodiment of FIG. 1, cam follower 136 comprises a roller 142 that is rotationally coupled to a distal end of spring 138. In the embodiment of FIG. 1, roller 142 is supported such that it rotates about a rotational axis. With reference to FIG. 1, it will be appreciated that a proximal end of spring 138 is seated against a spring plate 144.

Figure 2:
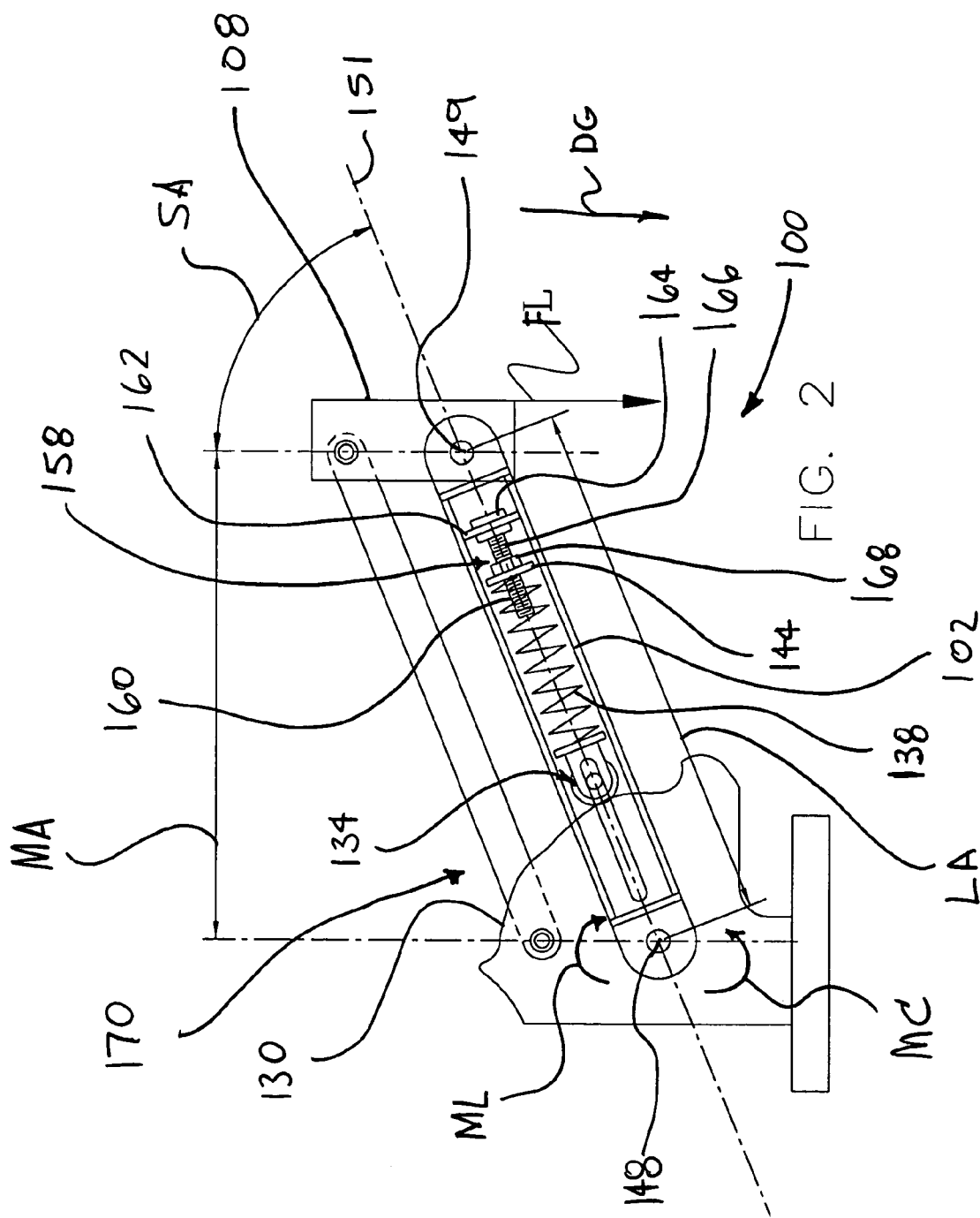
FIG. 2 is an additional diagrammatic representation of support arm shown in the previous figure.

FIG. 2 is an additional diagrammatic representation of support arm 100 shown in the previous figure. In the embodiment of FIG. 2, distal link 108 supports a load. It is to be appreciated that various loads may be supported using support arm 100 without deviating from the spirit and scope of the present invention. In FIG. 2, the effect of gravity on the load is illustrated using an arrow labeled FL. A direction of gravitational pull illustrate using an arrow labeled DG in FIG. 2. With reference to FIG. 2, it will be appreciated that the arrow labeled FL and the arrow labeled DG are generally parallel to one another.

Support arm 100 includes a spring adjustment mechanism 158 comprising a screw 160, a spring plate 144 and a flange 162. Screw 160 has a head 164 and a shaft 166. In the embodiment of FIG. 2, shaft 166 of screw 160 threadingly engages a threaded portion 168 of spring plate 144. In the embodiment of FIG. 2, flange 162 is fixed to first strut 102. The upper end of the spring can be moved by means of adjustment mechanism 158 to adjust the amount of the pre-load on spring 138. This adjustment allows the use of the same support arm for balancing a range of loads.

With reference to FIG. 2, it will be appreciated that first strut 102 is dimensioned so that a first proximal pivot axis 148 and a first distal pivot axis 149 are separated by a pre-selected distance that is labeled LA in FIG. 2. The load supported by support arm 100 produces a moment ML about first proximal pivot axis 148. This moment is equal to FL multiplied by an effective moment arm MA of support arm 100.

With reference to FIG. 2, it will be appreciated that a strut angle SA is defined by a longitudinal axis 151 of first strut 102 and the direction of gravitational pull DG. In the embodiment of FIG. 2, the effective moment arm MA is equal the length of first strut 102 (LA) multiplied by the Sin the strut angle SA. This relationship may be expressed mathematically as follows:

$$ML = FL * LA * \sin(SA)$$

In the embodiment of FIG. 2, cam 130 and cam follower 134 form a cam mechanism 170. With reference to FIG. 2, it will be appreciated that cam mechanism 170 produces a moment MC about first proximal pivot axis 148. In some embodiments of the present invention, the moment produced by a cam mechanism is capable of balancing the moment created by a load supported by a support arm throughout the travel of the support arm.

Figure 3:
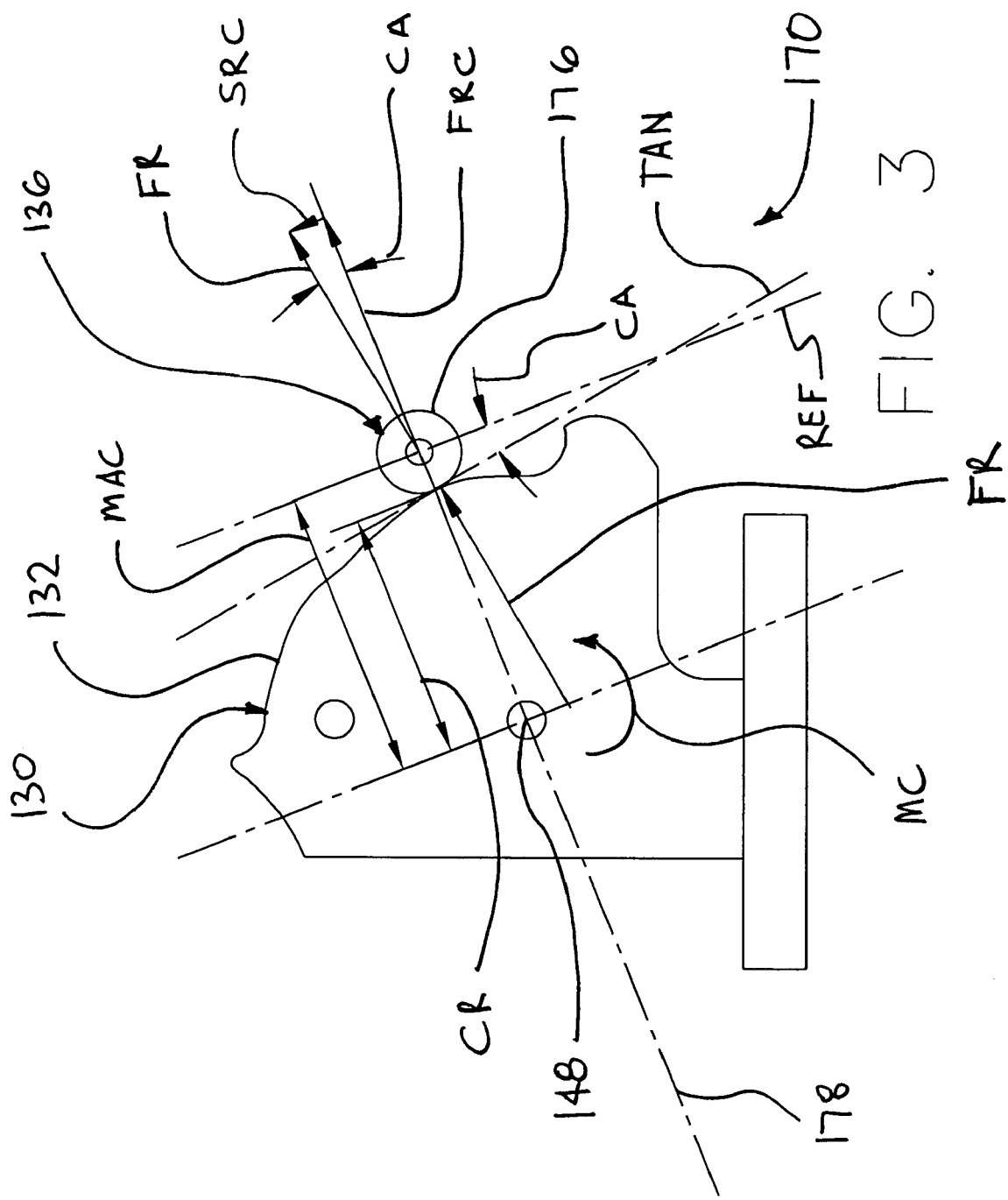
FIG. 3 is an enlarged diagram illustrating the forces acting on cam follower shown in the previous figure.

FIG. 3 is an enlarged diagram illustrating the forces acting on cam follower 136 shown in the previous figure. As shown in FIG. 3, first cam surface 132 of cam 130 acts on first following surface 176 of first cam follower 136 with a reactionary force FR. As illustrated in FIG. 3, reactionary force FR may be resolved into a first reaction component FRC that is generally parallel to longitudinal axis 178 of first strut 102 and a second reaction component SRC that generally perpendicular to longitudinal axis 178. In the embodiment of FIG. 3, first reaction component FRC acts to compress spring 138 and second reaction component SRC produces a cam moment MC about first proximal pivot axis 148.

In FIG. 3, a contact angle CA of cam mechanism 170 is defined by a tangent line TAN and a reference line REF that is perpendicular to longitudinal axis 178 of strut 102. Contact angle CA may be used to calculate first reaction component FRC and second reaction component SRC as follows:

$$FRC = FR * \cos(CA)$$

$$SRC = FR * \sin(CA)$$

Solving for FR in both expressions above yields:

$$FR = \frac{SCR}{\sin(CA)} = \frac{FRC}{\cos(CA)}$$

Second reaction component SRC can be calculated as a function of first reaction component FRC. By solving for SRC, yielding:

$$SRC = FRC/(\tan(CA))$$

The magnitude of first reaction component FRC may be calculated as a function of the spring constant (K) of spring 138 and the deflection (d) of spring 138:

$$FRC = K * d$$

Substituting this relationship into the equation above yields:

$$SRC = (K * d)/(\tan(CA))$$

The cam moment MC about first proximal pivot axis 148 is equal to the second reaction component multiplied by a moment arm of cam mechanism 170 (MAC). The moment arm MAC and a cam radius CR are both shown in FIG. 3.

$$MC = K * d * MAC/(\tan(CA))$$

In some embodiments of the present invention, the moment produced by a cam mechanism is capable of balancing the moment created by a load supported by a support arm. This relationship may be expressed as:

$$ML = MC$$

Substituting the equations for ML and MC into this equation yields:

$$FL * LA * \sin(SA) = K * d * MAC/(\tan(CA))$$

Figure 4:
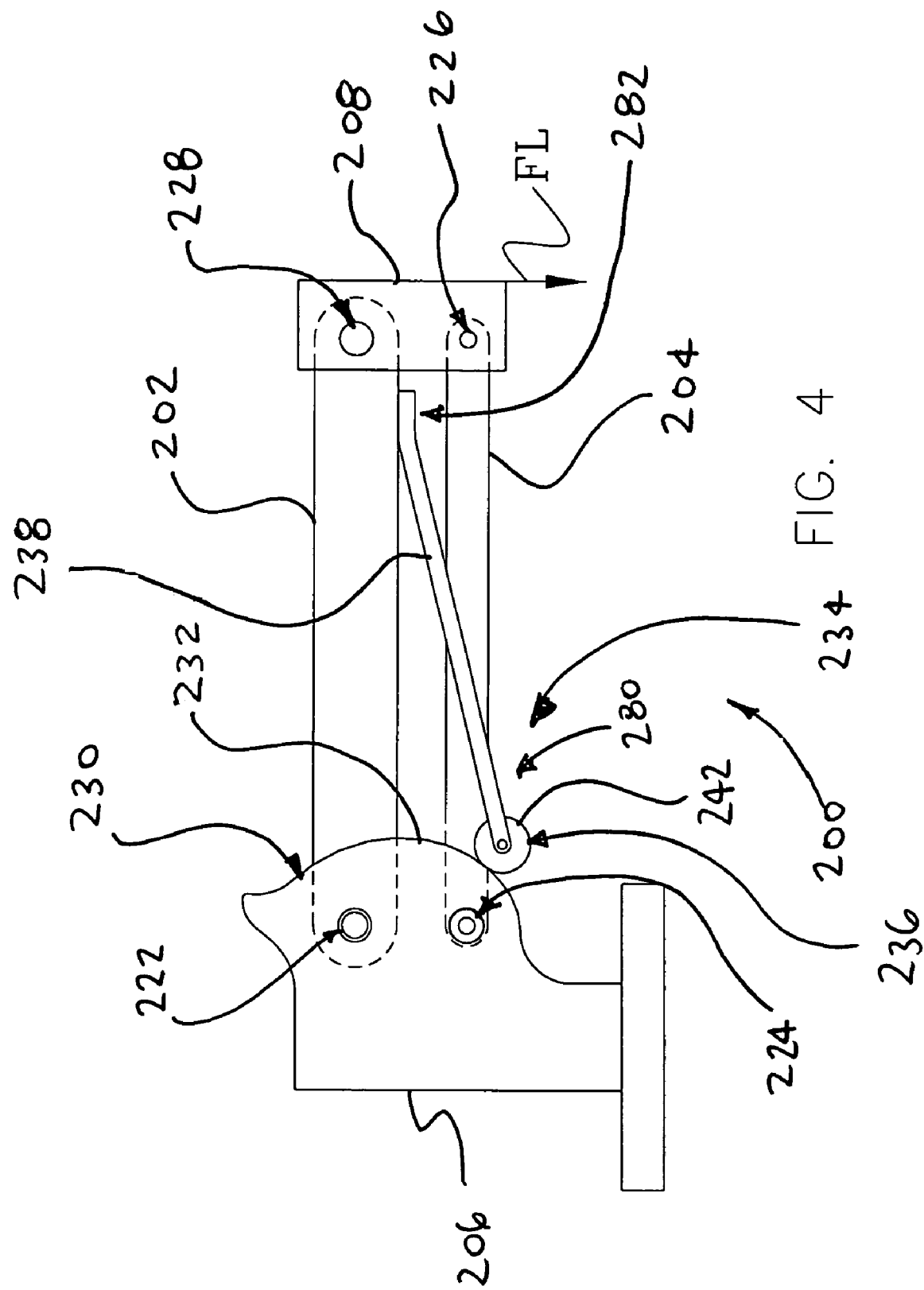
FIG. 4 is a diagrammatic representation of a support arm in accordance with an additional exemplary embodiment of the present invention.

FIG. 4 is a diagrammatic representation of a support arm 200 in accordance with an additional exemplary embodiment of the present invention. Support arm 200 includes a first strut 202, a second strut 204, a proximal link 206, and a distal link 208. In the embodiment of FIG. 4, a proximal portion of the first strut 202 is pivotally coupled to proximal link 206 at a first proximal joint 222. Additionally, a proximal portion of second strut 204 is pivotally coupled to proximal link 206 at a second proximal joint 224. A distal end of second strut 204 is pivotally coupled to distal link 208 at a second distal joint 226. A distal end of first strut 202 is pivotally coupled to distal link 208 at a first distal joint 228.

In the embodiment of FIG. 4, proximal link 206 comprises a cam 230 having a first cam surface 232. Support arm 200 of FIG. 4 also includes a cam following assembly 234. In the embodiment of FIG. 4, cam following assembly 234 comprises a spring 238 that is capable of urging a cam follower 236 against first cam surface 232 of cam 230. In the embodiment of FIG. 4, cam follower 236 comprises a roller 242 that is rotationally coupled to a distal part 280 of spring 238. With reference to FIG. 4, it will be appreciated that a proximal part 282 of spring 238 is fixed to first strut 202. In the embodiment of FIG. 4, roller 242 is supported such that it rotates about a rotational axis.

In the embodiment of FIG. 4, distal link 208 supports a the load. In FIG. 4, the effect of gravity on the load is illustrated using an arrow labeled FL. It is to be appreciated that various loads in any direction (i.e., up, down or sideways) may be supported using support arm 200 without deviating from the spirit and scope of the present invention.

Figure 5:
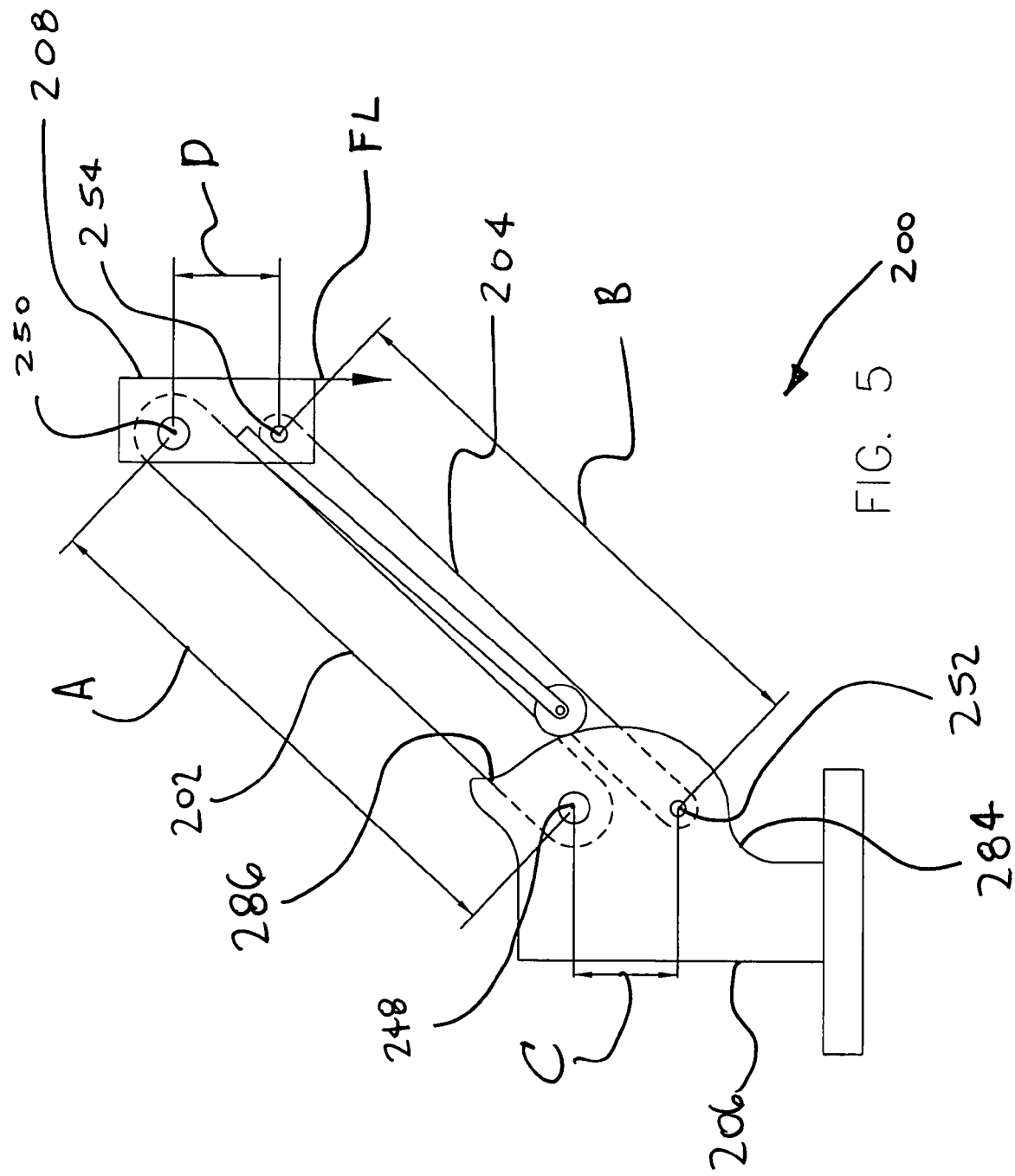
FIG. 5 is an additional diagrammatic representation of the support arm shown in the previous figure.

FIG. 5 is an additional diagrammatic representation of support arm 200 shown in the previous figure. In the embodiment of FIG. 5, support arm 200 is shown assuming a more raised configuration relative to the configuration shown in the previous figure. In FIG. 5, the effect of gravity on the load is illustrated using an arrow labeled FL.

With reference to FIG. 5, it will be appreciated that first strut 202 is dimensioned so that first proximal pivot axis 248 and first distal pivot axis 250 are separated by a pre-selected distance that is labeled A in FIG. 5. Also with reference to FIG. 5, it will be appreciated that second strut 204 is dimensioned so that second proximal pivot axis 252 and second distal pivot axis 254 are separated by a pre-selected distance that is labeled B in FIG. 5. Additionally, in the embodiment of FIG. 5, proximal link 206 is dimensioned so that first proximal pivot axis 248 and second proximal pivot axis 252 are separated by a pre-selected distance that is labeled C in FIG. 5. Furthermore, distal link 208 is dimensioned so that first distal pivot axis 250 and second distal pivot axis 254 are separated by a pre-selected distance D in the embodiment of FIG. 5.

In the embodiment of FIG. 5, distance A is generally equal to distance B and distance C is generally equal to distance D. When this is the case, first strut 202, second strut 204, proximal link 206 and distal link 208 cooperate to form a parallellogram linkage. When this is the case, distal link 208 remains substantially parallel to proximal link 206 as roller 242 travels between a first stop 284 and a second stop 286.

Figure 6:
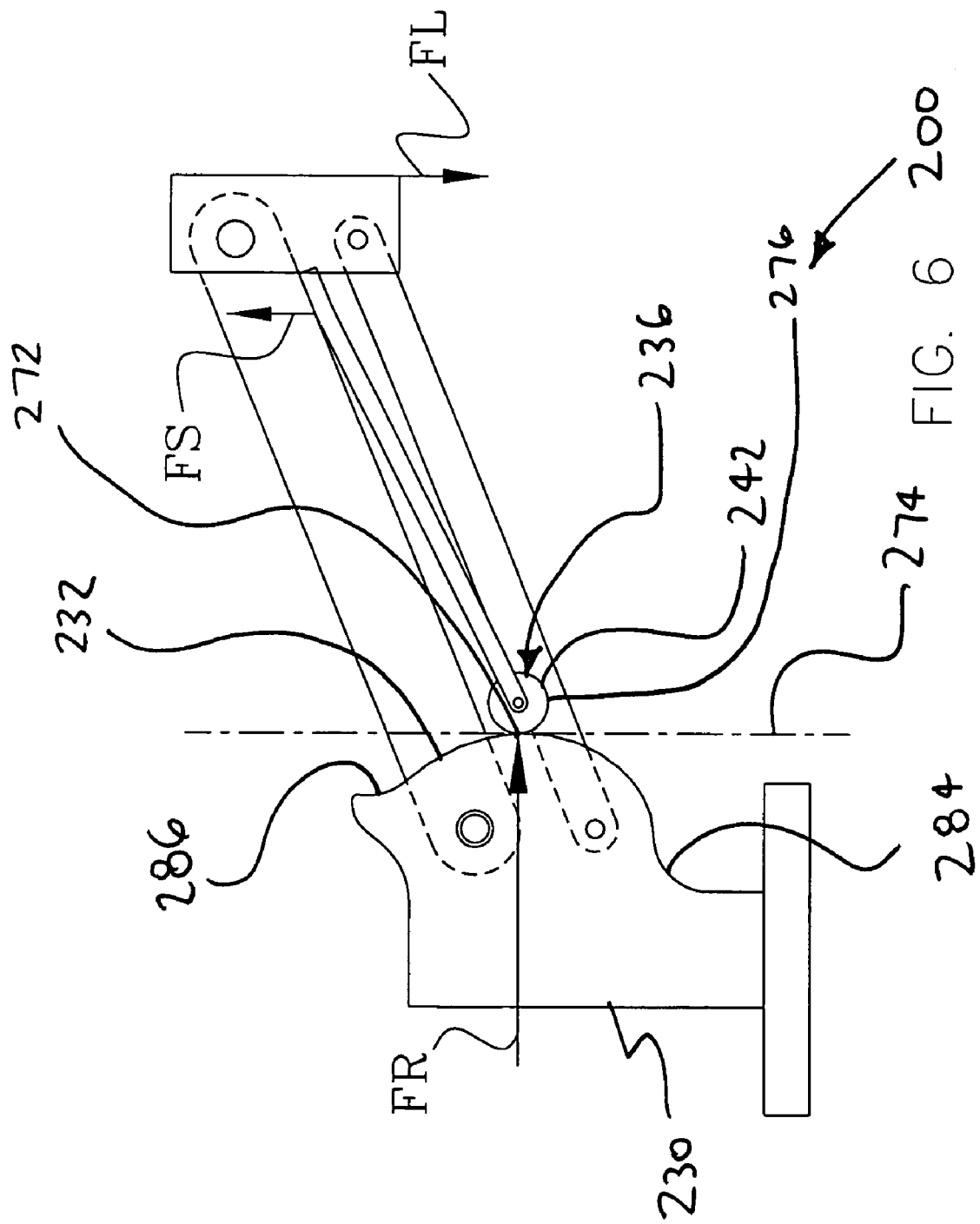
FIG. 6 is an additional diagrammatic representation of the support arm shown in the previous figure.

FIG. 6 is an additional diagram showing support arm 200. In the embodiment of FIG. 6, roller 242 is disposed in an intermediate position between first stop 284 and second stop 286. In the embodiment of FIG. 6, cam follower 236 contacts first cam surface 232 of cam 230 at a first contact point 272. A tangent line 274 is shown intersecting first contact point 272 in FIG. 6. With reference to FIG. 6 it will be appreciated that tangent line 274 is substantially tangent to both first following surface 276 of first cam follower 236 and first cam surface 232 of cam 230 at first contact point 272. As shown in FIG. 6, first cam surface 232 of cam 230 acts on first following surface 276 of first cam follower 236 with a reactionary force FR.

Figure 7:
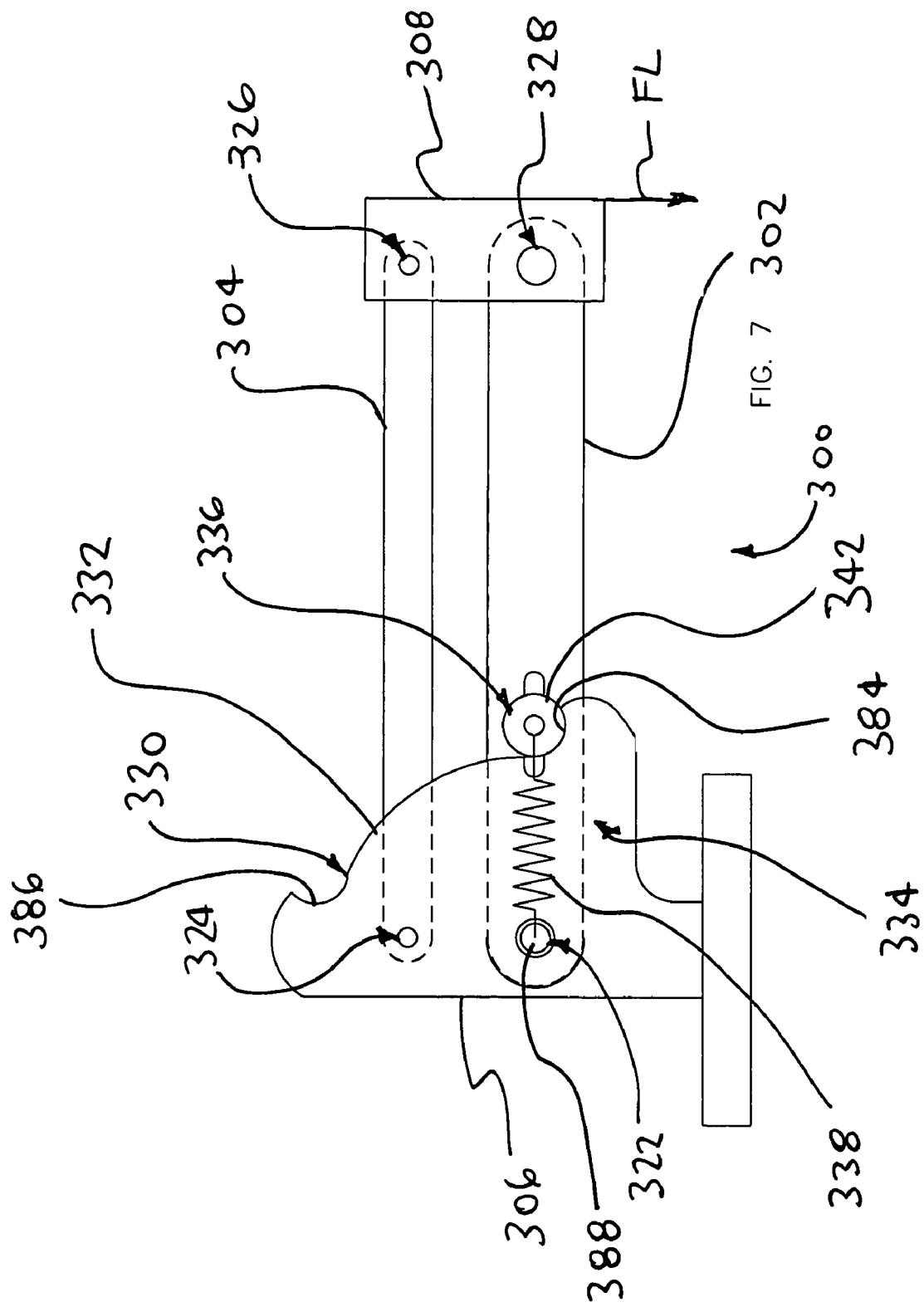
FIG. 7 is a diagrammatic representation of a support arm in accordance with an exemplary embodiment of the present invention.

FIG. 7 is a diagrammatic representation of a support arm 300 in accordance with an additional exemplary embodiment of the present invention. Support arm 300 includes a first strut 302, a second strut 304, a proximal link 306, and a distal link 308. In the embodiment of FIG. 7, a proximal portion of the first strut 302 is pivotally coupled to proximal link 306 at a first proximal joint 322. Additionally, a proximal portion of second strut 304 is pivotally coupled to proximal link 306 at a second proximal joint 324. A distal end of second strut 304 is pivotally coupled to distal link 308 at a second distal joint 326. A distal end of first strut 302 is pivotally coupled to distal link 308 at a first distal joint 328.

In the embodiment of FIG. 7, proximal link 306 comprises a cam 330 having a first cam surface 332. Support arm 300 of FIG. 7 includes a cam following assembly 334 comprising a cam follower 336 and a spring 338 that is capable of urging cam follower 336 against first cam surface 332 of cam 330. In the embodiment of FIG. 7, spring 338 comprises an extension spring. Also in the embodiment of FIG. 7, cam follower 336 comprises a roller 342 that is rotationally coupled to a distal end of spring 338. With reference to FIG. 7, it will be appreciated that a proximal end of spring 338 coupled to a pin 388.

In the embodiment of FIG. 7, distal link 308 supports a the load. In FIG. 7, the effect of gravity on the load is illustrated using an arrow labeled FL. It is to be appreciated that various loads may be supported using support arm 300 without deviating from the spirit and scope of the present invention. In FIG. 7, support arm 300 is shown assuming a fully retracted configuration. In FIG. 7, roller 342 is shown seated against a first stop 384 of cam 330. A second stop 386 of cam 330 is also visible in FIG. 7.

Figure 8:
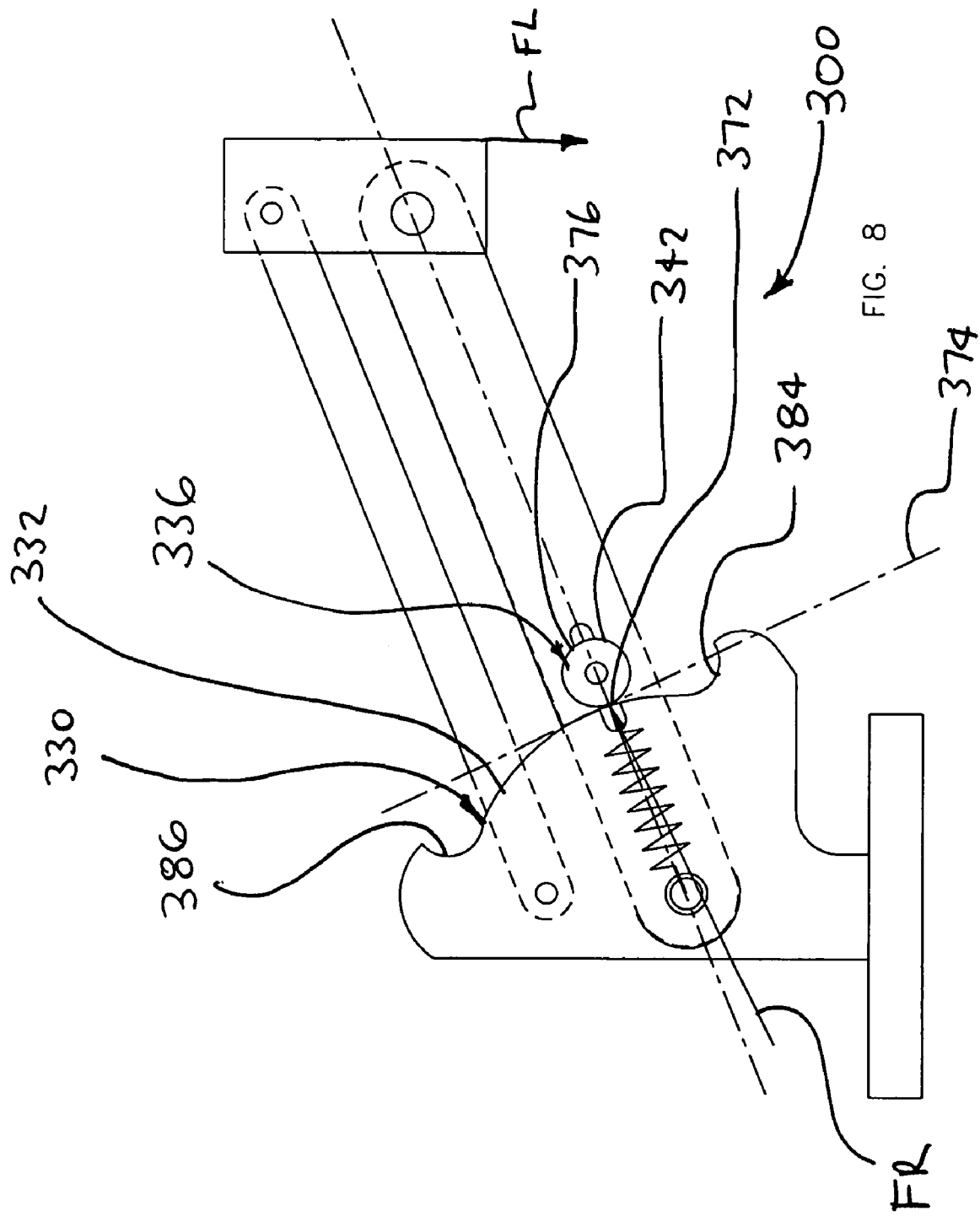
FIG. 8 is an additional diagrammatic representation of support arm shown in the previous figure.

FIG. 8 is an additional diagrammatic representation of support arm 300 shown in the previous figure. In the embodiment of FIG. 8, support arm 300 is shown assuming an intermediate configuration. In the embodiment of FIG. 8, roller 342 is disposed in an intermediate position between first stop 384 and second stop 386. In the embodiment of FIG. 8, cam follower 336 contacts first cam surface 332 of cam 330 at a first contact point 372. A tangent line 374 is shown intersecting first contact point 372 in FIG. 8. With reference to FIG. 8 it will be appreciated that tangent line 374 is generally tangent to both first following surface 376 of first cam follower 336 and first cam surface 332 at first contact point 372. As shown in FIG. 8, first cam surface 332 of cam 330 acts on first following surface 376 of first cam follower 336 with a reactionary force FR.

Figure 9:
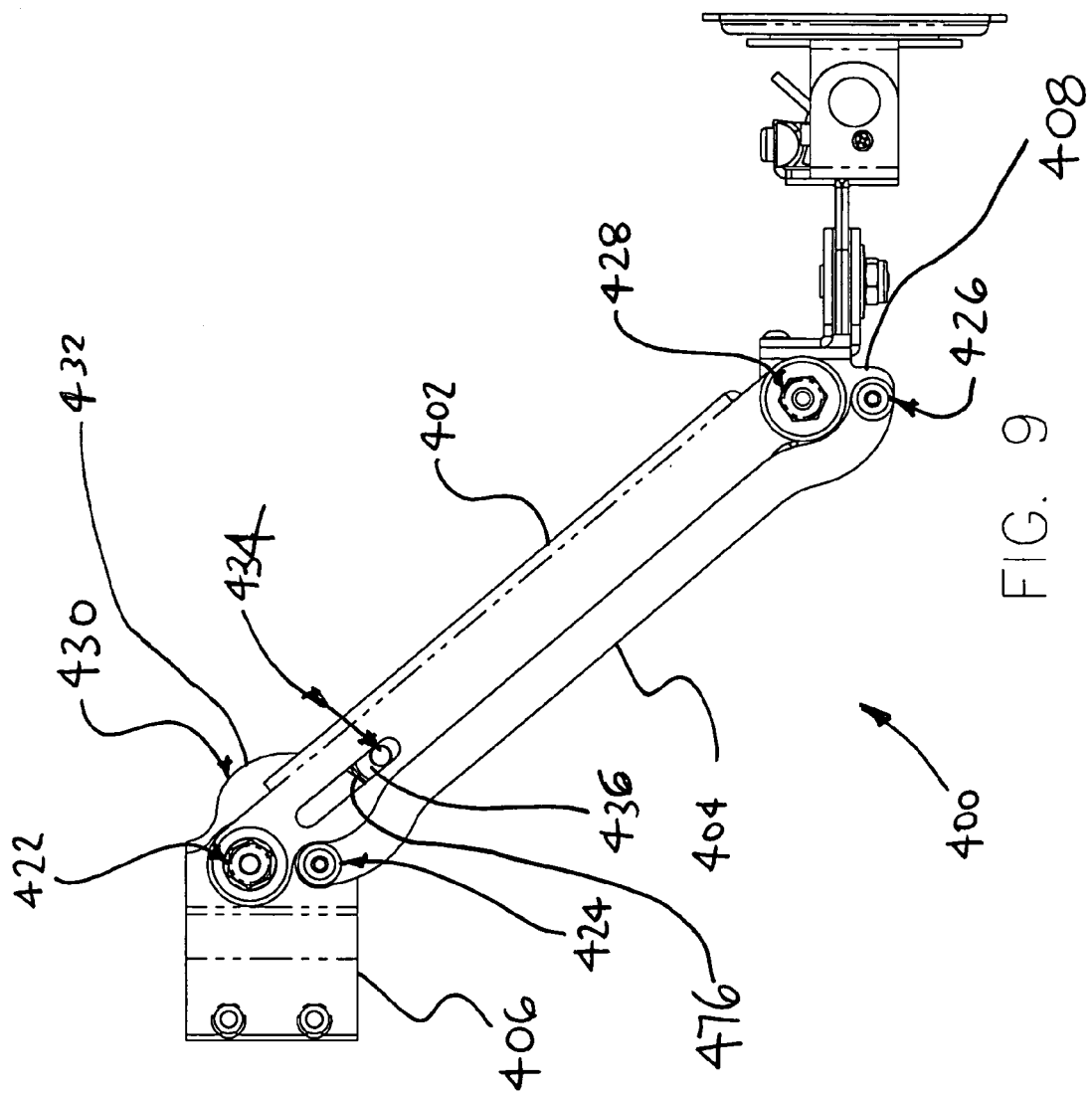
FIG. 9 is a side view of a support arm in accordance with an additional exemplary embodiment of the present invention.

FIG. 9 is a side view of a support arm 400 in accordance with an additional exemplary embodiment of the present invention. Support arm 400 includes a proximal bracket 406 comprising a cam 430. A first strut 402 is pivotally coupled to proximal bracket 406 at a first proximal joint 422 and a second strut 404 is pivotally coupled to proximal bracket 406 at a second proximal joint 424. A distal end of second strut 404 is pivotally coupled to a distal bracket 408 at a second distal joint 426. A distal end of first strut 402 is pivotally coupled to distal bracket 408 at a first distal joint 428. Support arm 400 of FIG. 9 includes a cam following assembly 434 comprising a cam follower 436. In FIG. 9, a first following surface 476 of cam follower 436 can be seen contacting a first cam surface 432 of cam 430.

Figure 10:
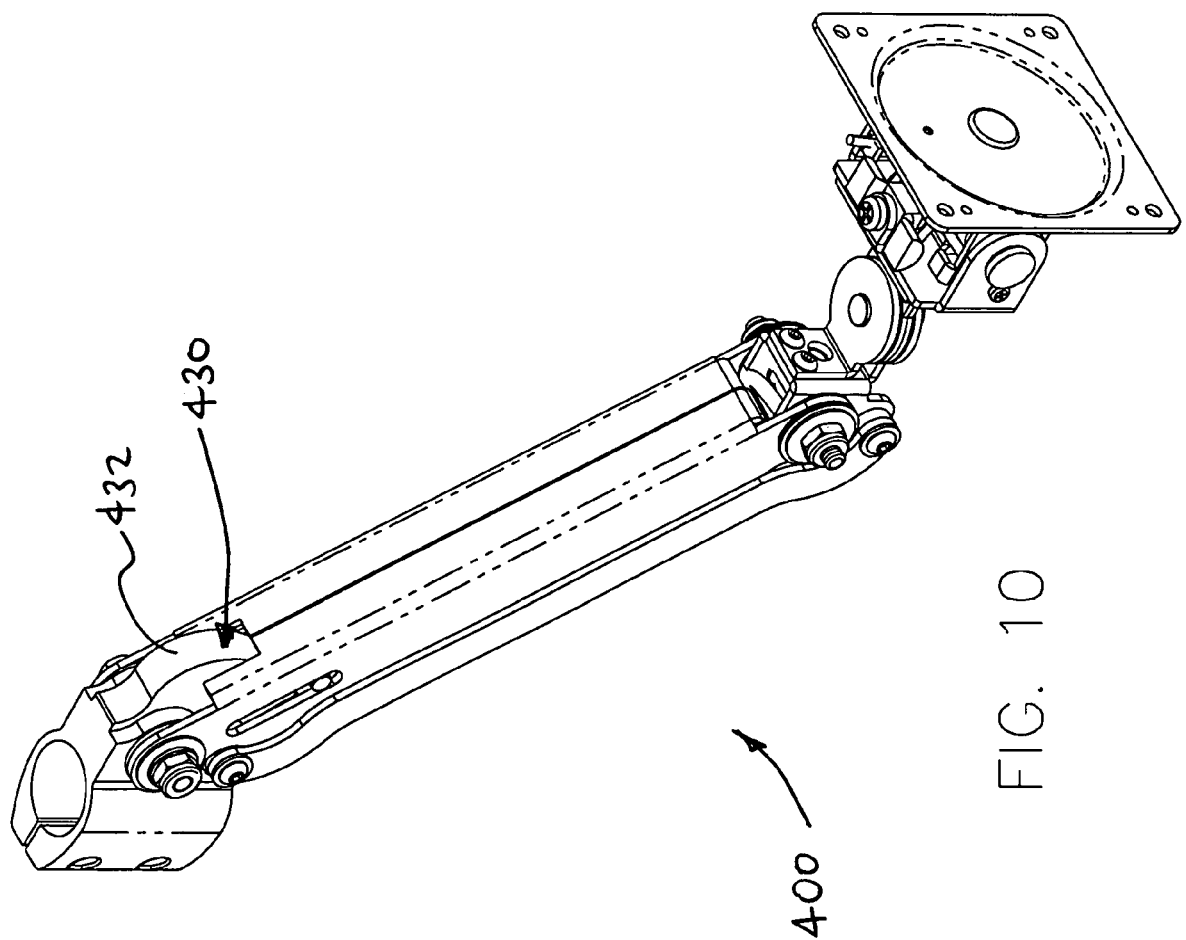
FIG. 10 is a perspective view of the support arm shown in the previous figure.

FIG. 10 is a perspective view of support arm 400 shown in the previous figure. A first cam surface 432 of cam 430 is visible in FIG. 10. In FIG. 10, support arm 400 is assuming a lowered position.

Figure 11:
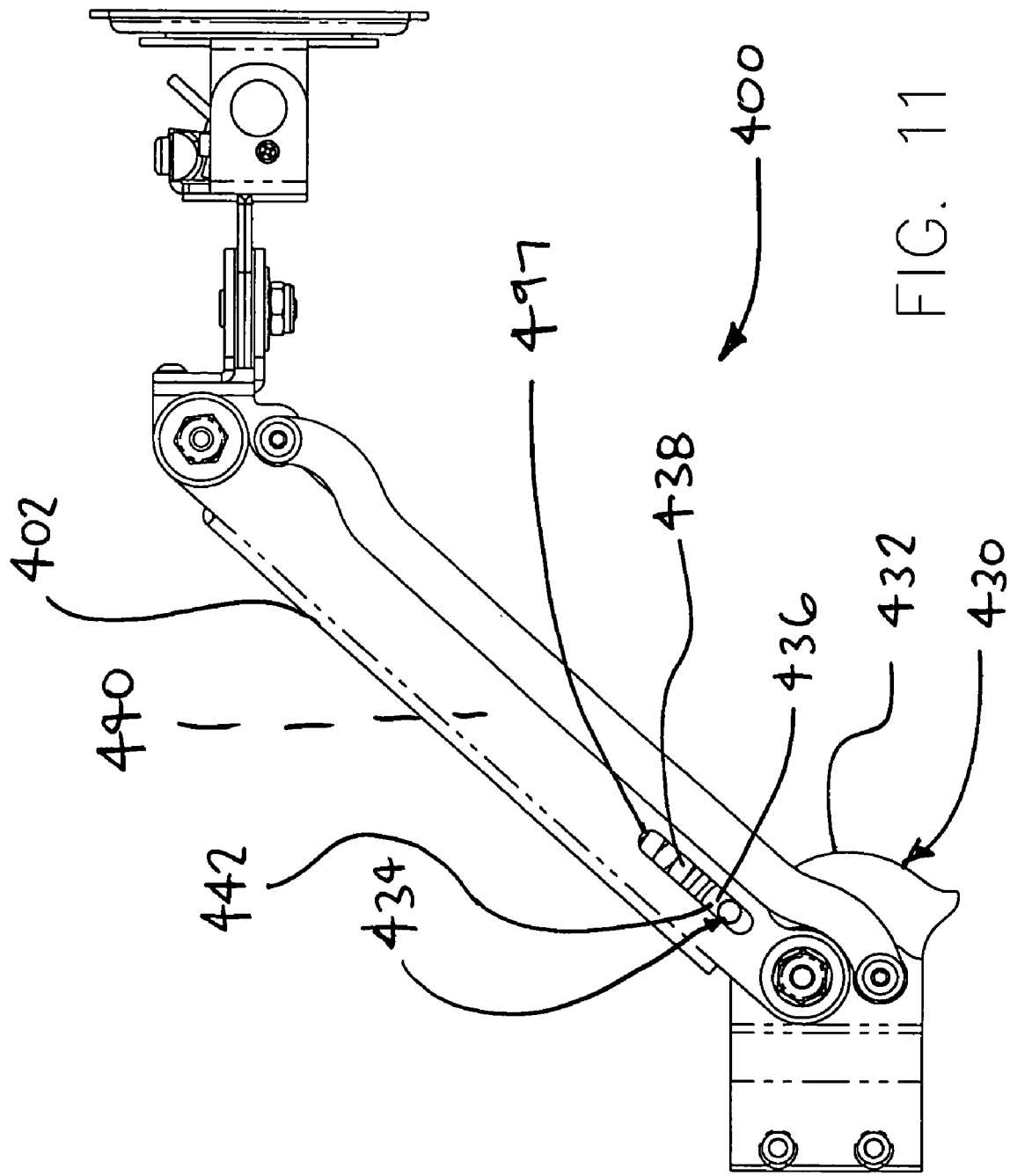
FIG. 11 is a side view of the support arm shown in the previous figure.

FIG. 11 is a side view of support arm 400 shown in the previous figure. In FIG. 11, support arm 400 is assuming a raised position. Support arm 400 of FIG. 11 includes a cam following assembly 434 comprising a cam follower 436 and a spring 438 that is capable of urging cam follower 436 against first cam surface 432 of cam 430. In the embodiment of FIG. 11, cam follower 436 and spring 438 are disposed within a lumen 440 defined by first strut 402. Also in the embodiment of FIG. 11, cam follower 436 comprises a roller 442 that is rotationally coupled to a distal end of spring 438. In the embodiment of FIG. 11, roller 442 is supported such that it rotates about a rotational axis. With reference to FIG. 11, it will be appreciated that first strut 402 defines a slot 497 that communicates with lumen 440.

Figure 12:
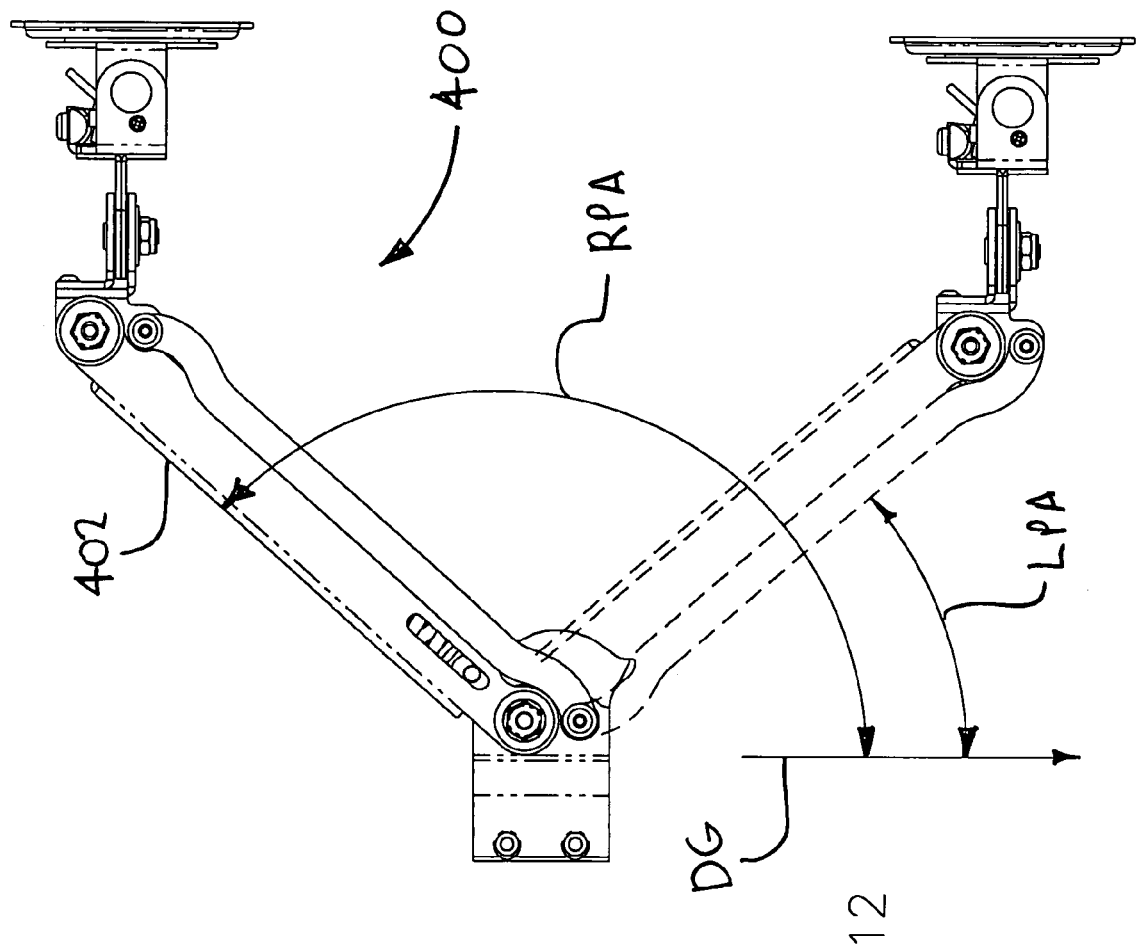
FIG. 12 is a side view of the support arm shown in the previous figure.

FIG. 12 is a side view of support arm 400 shown in the previous figure. In FIG. 12, support arm 400 is shown assuming a raised position. A lowered position support arm 400 is illustrated using dashed lines in FIG. 12. The direction of gravitational pull DG is illustrated with an arrow in FIG. 12.

With reference to FIG. 12, it will be appreciated that first strut 402 is disposed at an raised position angle RPA relative to the direction of gravitational pull when support arm 400 assumes the raised position. Also with reference to FIG. 12, it will be appreciated that first strut 402 is disposed at an lowered position angle LPA relative to the direction of gravitational pull when support arm 400 assumes the lowered position.

In the exemplary embodiment of FIG. 12, lowered position angle LPA is equal to about 40 degrees and raised position angle RPA is equal to about 140 degrees. It will be appreciated that various lowered position angles and raised position angles are possible without deviating from the spirit and scope of the present invention. For example, embodiments of the present invention are possible in which lowered position angle LPA is equal to about 0 degrees and raised position angle RPA is equal to about 180 degrees.

Figure 13:
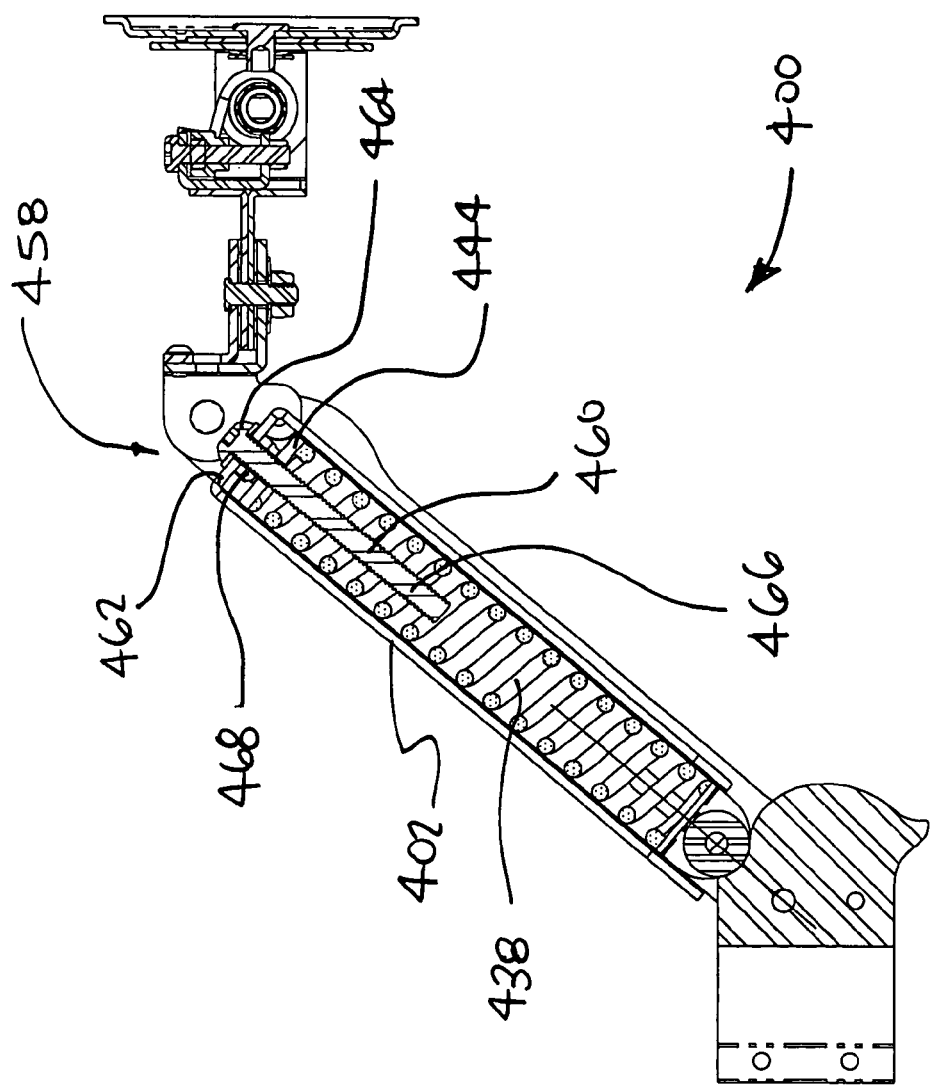
FIG. 13 is a cross sectional view of the support arm 100 shown in the previous figure.

FIG. 13 is a cross sectional view of support arm 400 shown in the previous figure. With reference to FIG. 13, it will be appreciated that support arm 400 includes a spring adjustment mechanism 458 comprising a screw 460, a spring plate 444 and a flange 462. Screw 460 has a head 464 and a shaft 466. In the embodiment of FIG. 13, shaft 466 of screw 460 threadingly engages a threaded portion 468 of spring plate 444. In the embodiment of FIG. 13, flange 462 is fixed to first strut 402. The upper end of the spring can be moved by means of adjustment mechanism 458 to adjust the amount of the pre-load on spring 438. This adjustment allows the use of the same support arm for balancing loads having a range of weights.

Figure 14:
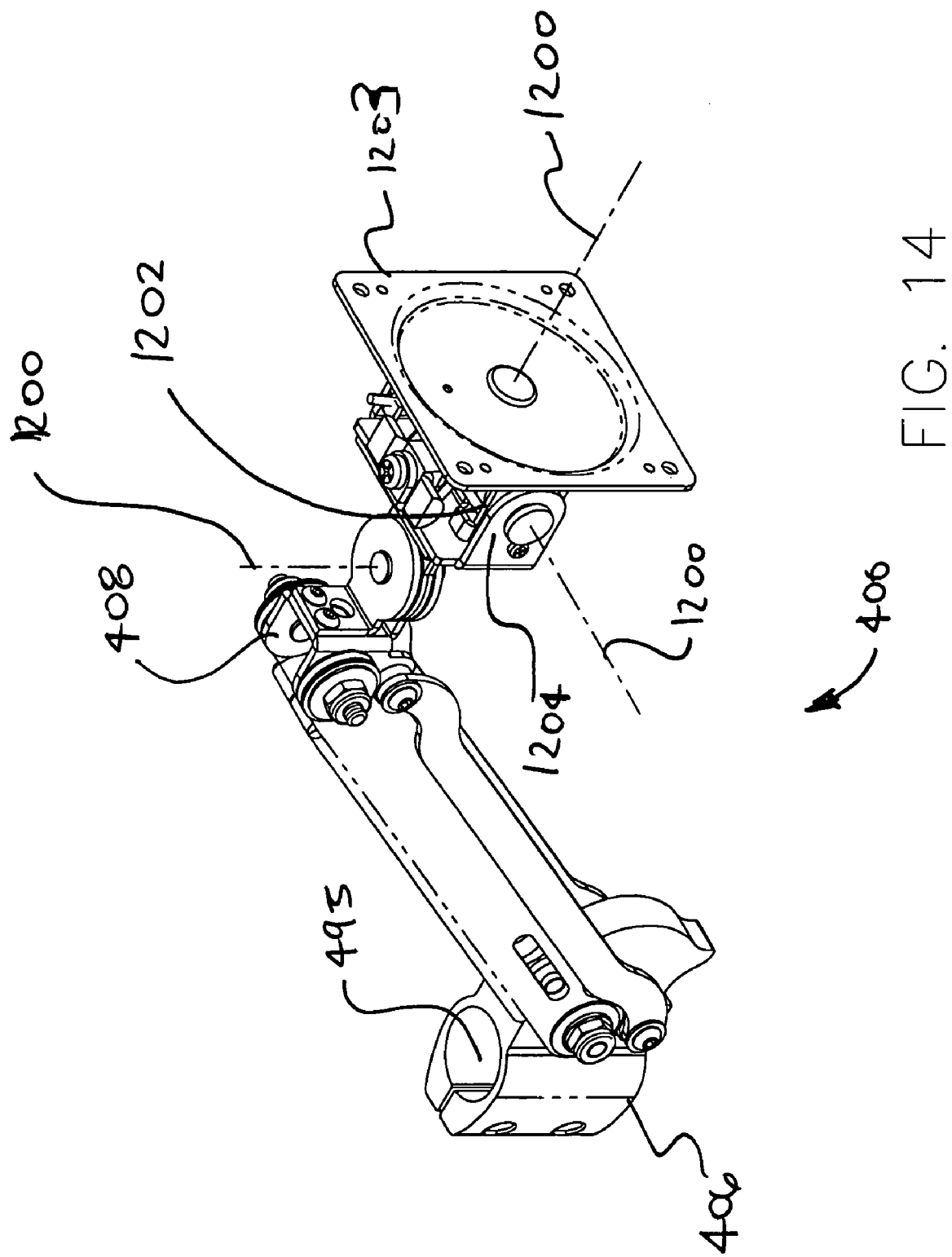
FIG. 14 is a perspective view of support arm 100 shown in the previous figure.

FIG. 14 is a perspective view of support arm 400 shown in the previous figure. With reference to FIG. 14, it will be appreciated that proximal bracket 406 of support arm 400 defines a channel 495. In some embodiments of the present invention, channel 495 is dimensioned to receive a mounting pole.

With reference to FIG. 14, it will be appreciated that a mounting bracket 1203 is connected to distal bracket 408 of support arm 400. In the embodiment of FIG. 14, mounting bracket 1203 is connected to distal bracket 408 in a manner that provides mounting bracket 1203 with three rotational degrees of freedom relative to distal bracket 408. Mounting bracket 1203 is connected to a first structural member 1202. Mounting bracket 1203 and a first structural member 1202 are free to rotate relative to one another about a first axis of articulation 1200. First structural member 1202 and a second structural member 1204 are free to rotate relative to one another about a second axis of articulation 1200. Second structural member 1204 and distal bracket 408 are free to rotate relative to one another about a third axis of articulation 1200. In the embodiment of FIG. 14, the first axis of articulation, the second axis of articulation, and the third axis of articulation are mutual perpendicular to one another.

Figure 15:
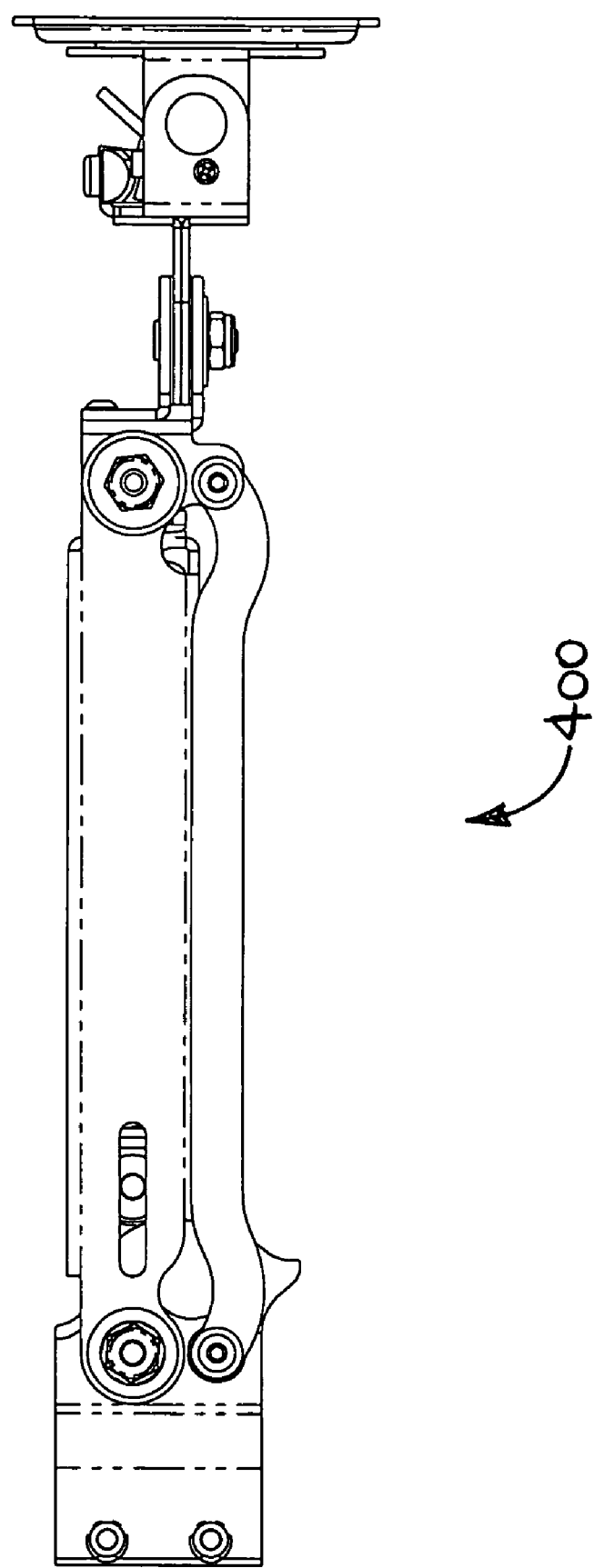
FIG. 15 is a side view of a support arm in accordance with an additional exemplary embodiment of the present invention.

FIG. 15 is a side view of a support arm 400. In the exemplary embodiment of FIG. 15, support arm 400 is assuming an intermediate position disposed between the raised position and the lowered position illustrated previously.

Figure 16:
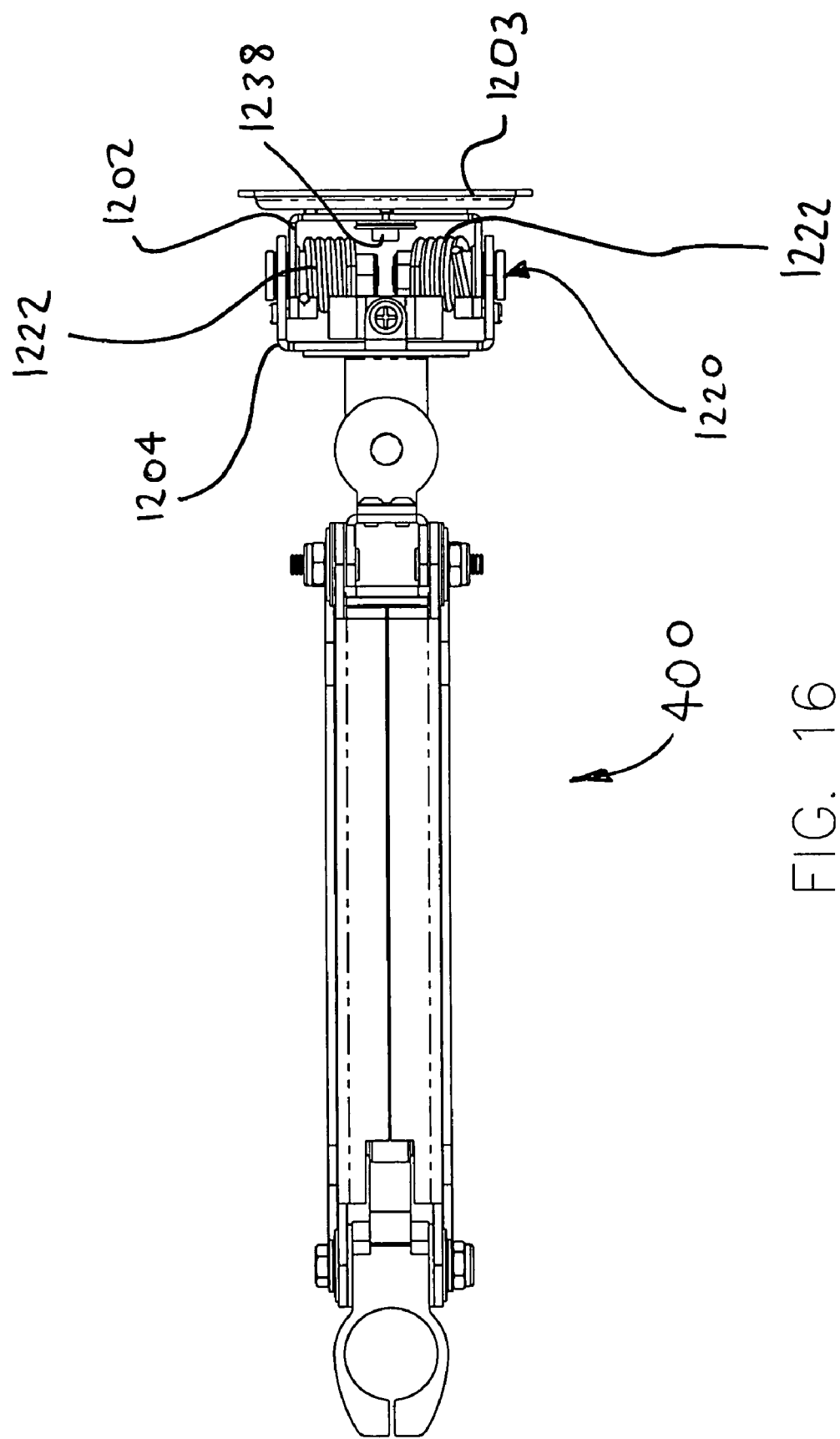
FIG. 16 is a top view of the support arm shown in the previous figure.

FIG. 16 is a top view of support arm 400 shown in the previous figure. With reference to FIG. 16, it will be appreciated that support arm 400 comprises a pivot mechanism 1220. Pivot mechanism 1220 comprises a second structural member 1204, a first structural member 1202 and a plurality of torsion springs 1222. A mounting bracket 1203 is pivotally connected to second structural member 1204 by a bolt or rivet 1238.

Figure 17:
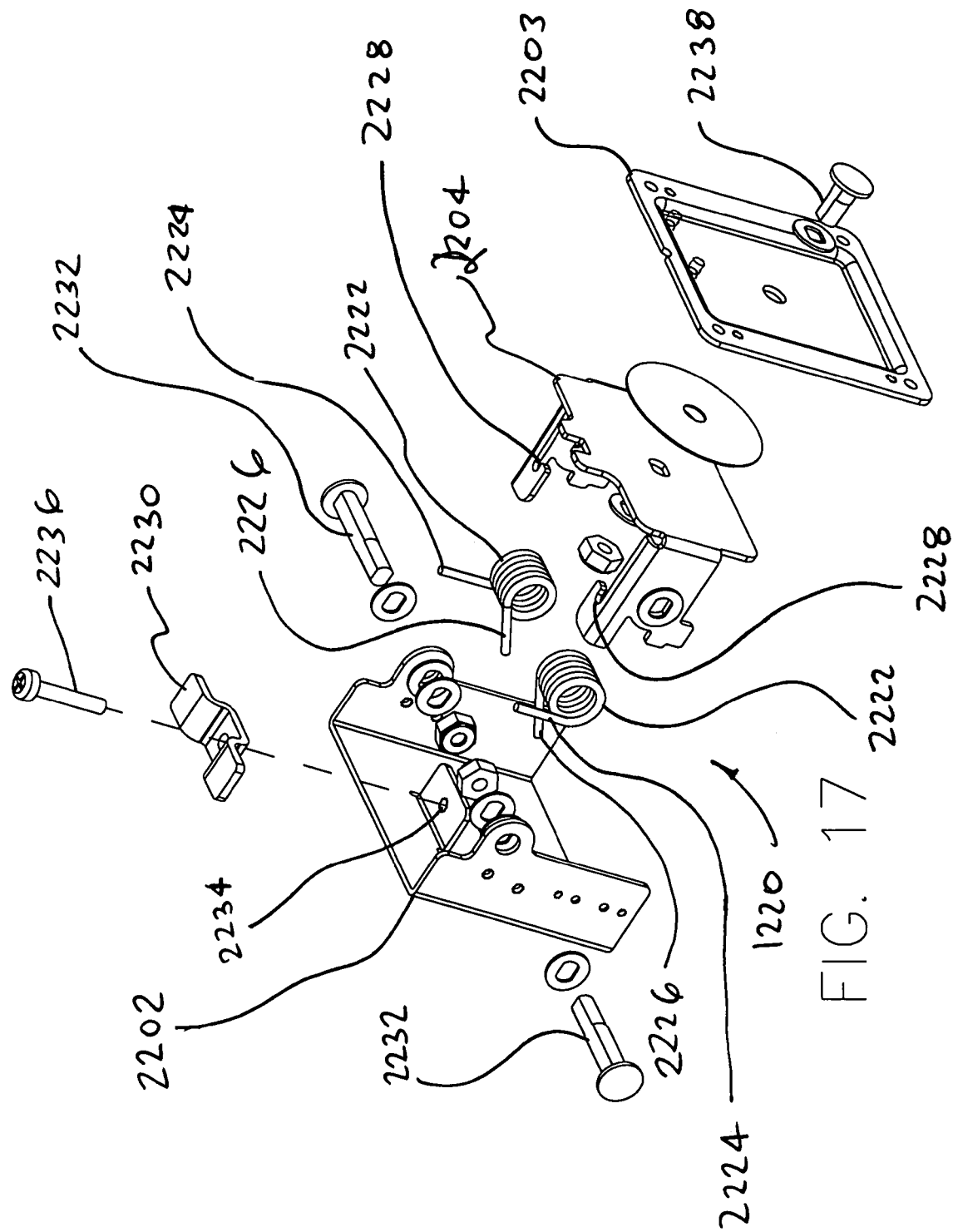
FIG. 17 is an exploded view of a pivot mechanism 220 in accordance with an exemplary embodiment of the present invention.

FIG. 17 is an exploded view of a pivot mechanism 2220 in accordance with an exemplary embodiment of the present invention. In FIG. 17, it may be appreciated that pivot mechanism 2220 comprises a second structural member 2204, a first structural member 2202 and a plurality of torsion springs 2222. When pivot mechanism 2220 is in a non-exploded state, a first leg 2224 of each torsion spring 2222 engages a notch 2228 defined by second structural member 2204. An adjustment plate 2230 may also engage a second leg 2226 of each torsion spring 2222.

Second structural member 2204 may be pivotally attached to a first structural member 2202 by a plurality of bolts or rivets 2232. In FIG. 17, it may be appreciated that first structural member 2202 defines a threaded hole 2234. Threaded hole 2234 is preferably adapted to receive a tilt adjust screw 2236. Tilt adjust screw 2236 may be used to adjust the position of the second leg 2226 of each torsion spring 2222 relative to it's first leg 2224. A mounting bracket 2203 may be pivotally connected to second structural member 2204 by a bolt or rivet 2238.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

The invention claimed is:

1. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
a cam follower coupled to the first strut, the cam follower contacting a cam surface of the cam at a first contact point; the cam and the cam follower cooperating to apply a cam moment to the first strut; and the cam moment being sufficient to balance a load supported by the distal link, further comprising a means for urging the cam follower against the cam surface of the cam wherein the means for urging the cam follower against the cam surface of the cam comprises a spring, and further comprising an adjustment mechanism for varying a characteristic of the spring, wherein the adjustment mechanism comprises a spring plate coupled to the spring.

2. The support arm of claim 1, wherein the adjustment mechanism comprises a screw for adjusting a position of the spring plate.

3. The support arm of claim 2, wherein the screw threadingly engages a threaded portion of the spring plate.

4. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
a cam follower coupled to the first strut, the cam follower contacting a cam surface of the cam at a first contact point; the cam and the cam follower cooperating to apply a cam moment to the first strut; and the cam moment being sufficient to balance a load supported by the distal link, wherein a strut angle is defined by a longitudinal axis of the first strut and a direction of gravitational pull, a contact angle is defined by a line that is perpendicular to the longitudinal axis of the first strut and a tangent line that is generally tangent to both the cam follower and the cam surface and that extends through the first contact point, the cam provides a reaction force supporting the cam follower when the cam follower is urged against the cam, the cam moment is provided by a moment creating component of the reaction force, and the cam is shaped so that the moment creating component of the reaction force varies as the first strut rotates relative to the cam.

5. The support arm of claim 4, wherein the cam moment varies as a function of a trigonometric SIN of the strut angle when the first strut rotates relative to the cam.

6. The support arm of claim 5, wherein the cam moment varies in proportion to a trigonometric SIN of the strut angle when the first strut rotates relative to the cam.

7. The support arm of claim 4, wherein the moment creating component of the reaction force varies as a function of the contact angle as the first strut rotates relative to the cam.

8. The support arm of claim 4, wherein the cam is shaped so that the contact angle varies as the first strut rotates relative to the cam.

9. The support arm of claim 8, wherein the cam is shaped so that a trigonometric TAN function of the contact angle varies as a function of a trigonometric SIN of the strut angle when the first strut rotates relative to the cam.

10. The support arm of claim 4, wherein the cam is shaped such that the contact angle changes when the first strut is rotated relative to the cam.

11. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
a cam follower coupled to the first strut, the cam follower contacting a cam surface of the cam at a first contact point; the cam and the cam follower cooperating to apply a cam moment to the first strut; and the cam moment being sufficient to balance a load supported by the distal link, wherein the cam is shaped so that a deflection of a spring varies as the first strut rotates relative to the cam.

12. The support arm of claim 11, wherein the deflection of the spring varies as a function of a trigonometric SIN of the strut angle when the first strut rotates relative to the cam.

13. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
a cam follower coupled to the first strut, the cam follower contacting a cam surface of the cam at a first contact point; the cam and the cam follower cooperating to apply a cam moment to the first strut; and the cam moment being sufficient to balance a load supported by the distal link, wherein the cam is shaped so that a radius of the cam varies when the first strut rotates relative to the cam.

14. The support arm of claim 13, wherein the cam is shaped so that the radius of the cam varies as a function of a trigonometric SIN of the strut angle when the first strut rotates relative to the cam.

15. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
a cam follower coupled to the first strut, the cam follower contacting a cam surface of the cam at a first contact point; the cam and the cam follower cooperating to apply a cam moment to the first strut; and the cam moment being sufficient to balance a load supported by the distal link, wherein the cam is shaped so that a radius of curvature of the cam varies when the first strut rotates relative to the cam.

16. The support arm of claim 15, wherein the cam is shaped so that a radius of curvature of the cam varies as a function of a trigonometric SIN of the strut angle when the first strut rotates relative to the cam.

17. The support arm of claim 15, wherein a spring is extended as the first strut rotates so that the first distal joint moves in a downward direction.

18. The support arm of claim 15, wherein a spring is compressed as the first strut rotates so that the first distal joint moves in a downward direction.

19. The support arm of claim 18, wherein the spring comprises a coil spring.

20. The support arm of claim 15, wherein the cam surface has a substantially continually changing slope.

21. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
cam follower coupled to the first strut, the cam follower contacting a cam surface of the cam at a first contact point; the cam and the cam follower cooperating to apply a cam moment to the first strut; and the cam moment being sufficient to balance a load supported by the distal link, wherein the cam surface has a substantially continually changing radius of curvature.

22. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
a cam follower coupled to the first strut, the cam follower contacting a cam surface of the cam at a first contact point; the cam and the cam follower cooperating to apply a cam moment to the first strut; and the cam moment being sufficient to balance a load supported by the distal link, wherein the cam has a substantially continually changing radius.

23. The support arm of claim 22, further comprising a second strut having a proximal portion pivotally coupled to the proximal link at a second proximal joint and a distal portion pivotally coupled to the distal link at a second distal joint, wherein the first strut, the second strut, the proximal link, and the distal link form a parallelogram.

24. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
a cam follower coupled to the first strut, the cam follower contacting a cam surface of the cam at a first contact point; the cam and the cam follower cooperating to apply a cam moment to the first strut; and the cam moment being sufficient to balance a load supported by the distal link, further comprising a means for urging the cam follower against the cam surface of the cam wherein the means for urging the cam follower against the cam surface of the cam comprises a spring, and further comprising an adjustment mechanism for varying a characteristic of the spring wherein the adjustment mechanism varies a pre-load of the spring.

25. A support arm, comprising:
a first strut having a proximal portion;
a proximal link pivotally coupled to the proximal portion of the first strut at a first proximal joint, the proximal link comprising a cam, wherein the first strut is rotatable relative to the cam about the first proximal joint;
a distal link pivotally coupled to a distal portion of the first strut at a first distal joint, wherein the first strut is rotatable relative to the distal link about the first distal joint; and
a cam follower coupled to the first strut, the cam follower contacting a cam surface of the cam at a first contact point; the cam and the cam follower cooperating to apply a cam moment to the first strut; and the cam moment being sufficient to balance a load supported by the distal link, further comprising a means for urging the cam follower against the cam surface of the cam wherein the means for urging the cam follower against the cam surface of the cam comprises a spring, and further comprising an adjustment mechanism for varying a characteristic of the spring wherein the adjustment mechanism varies a length of the spring.

* * * * *